(12) United States Patent
Nalder et al.

(10) Patent No.: US 7,996,368 B1
(45) Date of Patent: Aug. 9, 2011

(54) ATTRIBUTE-BASED INDEXERS FOR DEVICE OBJECT LISTS

(75) Inventors: Greg Nalder, Goodyear, AZ (US); Eric Luttmann, Eagle, ID (US)

(73) Assignee: Cyress Semiconductor Corporation, San Jose, CA (US)

( * ) Notice: Subject to any disclaimer, the term of this patent is extended or adjusted under 35 U.S.C. 154(b) by 982 days.

(21) Appl. No.: 11/220,141

(22) Filed: Sep. 6, 2005

Related U.S. Application Data (60) Provisional application No. 60/611,989, filed on Sep. 21, 2004.

(51) Int. Cl.
*G06F 17/30* (2006.01)

(52) U.S. Cl. ........................................ 707/673; 707/830

(58) Field of Classification Search ................... 707/673, 707/830
See application file for complete search history.

(56) References Cited

U.S. PATENT DOCUMENTS

| | | | | |
|---|---|---|---|---|
| 5,748,980 | A * | 5/1998 | Lipe et al. | 710/8 |
| 5,903,894 | A * | 5/1999 | Reneris | 707/100 |
| 7,263,528 | B2 * | 8/2007 | Haff et al. | 707/622 |
| 2005/0050004 | A1 * | 3/2005 | Sheu et al. | 707/1 |
| 2009/0060200 | A1 * | 3/2009 | Sheu et al. | 380/278 |

* cited by examiner

*Primary Examiner* — Frantz Coby (57) ABSTRACT

A device list is created including one or more device objects, wherein each device object represents a physical device coupled to a computer system, wherein each device object includes one or more device attributes of the physical device. The device list is indexed into using a device attribute.

14 Claims, 7 Drawing Sheets

```
int Count = getDeviceCount();
    CDevice streamer;
    DDevice wireless;

for (int i = 0; i < Count; i++) {
        CDevice dev = new CDevice(i);
        if (strcmp("Cy Streamer",dev->FriendlyName) == 0)
            streamer = dev;
        else
            delete dev;
    } for (int i = 0; i < Count; i++) {
        CDevice dev = new CDevice(i);
        if ( (0x04b4 == dev->VID) && (0x4C53 == dev->PID))
            wireless = dev;
        else
            delete dev;
    }
```

102 (first for loop)
104 (second for loop)

```
CDeviceList  Devices    = new CDeviceList( );
CDevice      streamer   = Devices["Cy Streamer"]
CDevice      wireless   = Devices[0x04b4, 0x4C53];
```

C# IMPLEMENTATION

FIG. 5

```
class CCyUSBDevice                    ← 602
{
   public:
      int    VendorID;
      int    ProductID;
      char   FriendlyName[255];
         .
         .
} class CCyUSBDeviceList                ← 604
{                           606
private:
CCyUSBDevice *Items[16];

public:
int Count;

CCyUSBDeviceList ( );
~CCyUSBDeviceList (void);

CCyUSBDevice* operator [ ](int x);
CCyUSBDevice* operator [ ](ULONG VidPid);    } 608
CCyUSBDevice* operator [ ](PCHAR s);         INDEX
};                                           OPERATORS
```

C++ DECLARATIONS

FIG. 6

```
CCyUSBDevice* CCyUSBDeviceList::operator [ ] (PCHAR fName)
{
        for (int i = 0; i < Count; i++)
                if (strcmp(fName,Items[i]->FriendlyName) == 0) return Items[i];

return NULL;
}
```

C++ IMPLEMENTATION OF
INDEX OPERATOR

FIG. 7

```
CyUSBDeviceList Devices = new CyUSBDeviceList( );
CyUSBDevice Listener = Devices["Cypress WirelessUSB Listener"];
```

C++ IMPLEMENTATION TO
OBTAIN A DEVICE OBJECT
REPRESENTING A DEVICE

ATTRIBUTE-BASED INDEXERS FOR DEVICE OBJECT LISTS

CROSS-REFERENCE TO RELATED APPLICATION

This application claims the benefit of U.S. Provisional Application No. 60/611,989, filed Sep. 21, 2004, and incorporated herein by reference in its entirety.

TECHNICAL FIELD

Embodiments of the invention relate to the field of electronic circuits and more specifically, but not exclusively, to circuits and software for locating and accessing an object representing a device.

BACKGROUND

The Universal Serial Bus (USB) is an electronic standard interface for connecting peripheral electronic devices to a host computer. USB connection ports exist on virtually all new personal computers and most electronic devices that are intended to attach to personal computers, such as printers, cameras, mice, keyboards, and many others. The USB is a standard interface defined and regulated by the USB Implementers Forum, Inc. (*Universal Serial Bus Specification*, revision 2.0, Apr. 27, 2000). Communication on the USB involves detailed protocols, rendering communication using USB devices complex for circuit designers.

A conventional technique for locating a given USB device includes several steps. In a first step, the technique determines how many devices are attached. In a second step, for each device, certain operations are performed. These operations include establishing a handle to the device, querying the device for its attributes, and comparing a specified attribute value with the corresponding attribute of the device sought.

Figure 1:
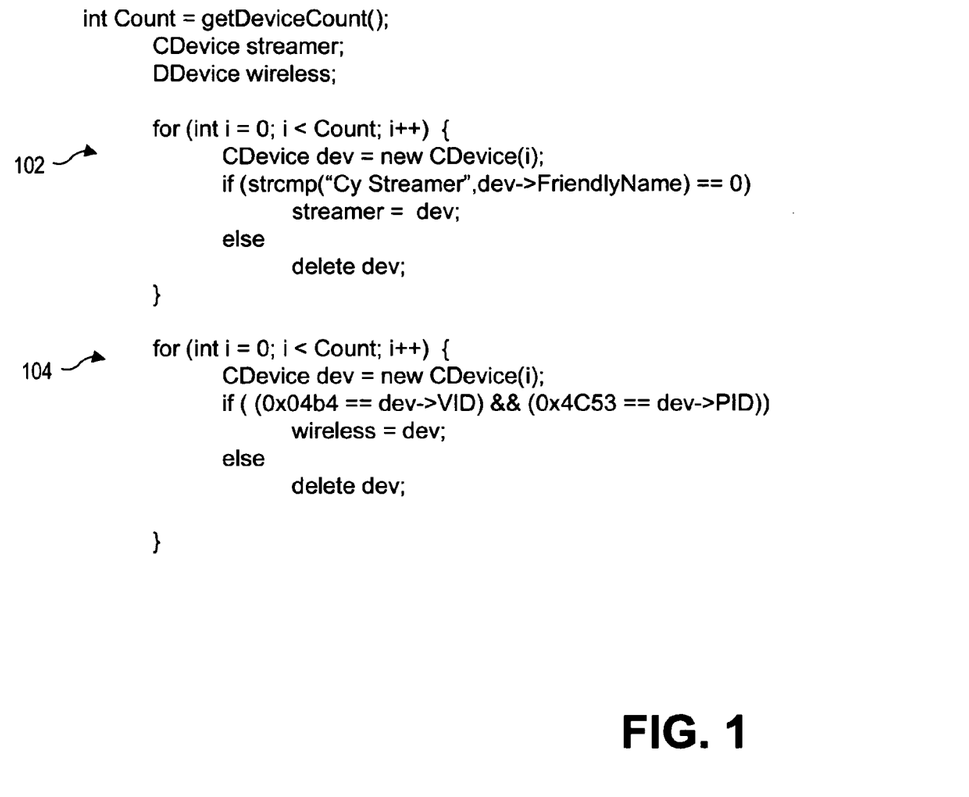
FIG. 1 shows code for a conventional solution to locate and identify a device.

An example of conventional solution is shown in FIG. 1. In the conventional solution, the code of FIG. 1 would find a device with a FriendlyName attribute equal to "Cy Streamer", shown at 102. In another instance, the code would find a device having a VID (Vendor Identification) attribute equal to 0x04b4 and PID (Product Identification) attribute equal to 0x4C53, shown at 104.

The implementation of the conventional algorithm is lengthy, and is semantically unnatural. The looping portion of this algorithm needs to be re-coded for each different attribute by which the programmer wants to search for a device, which is inefficient and prone to errors.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following description and claims, the term "coupled" and its derivatives may be used. "Coupled" may mean that two or more elements are in contact (physically, electrically, magnetically, optically, etc.). "Coupled" may also mean two or more elements are not in direct contact with each other, but still cooperate or interact with each other.

Figure 2:
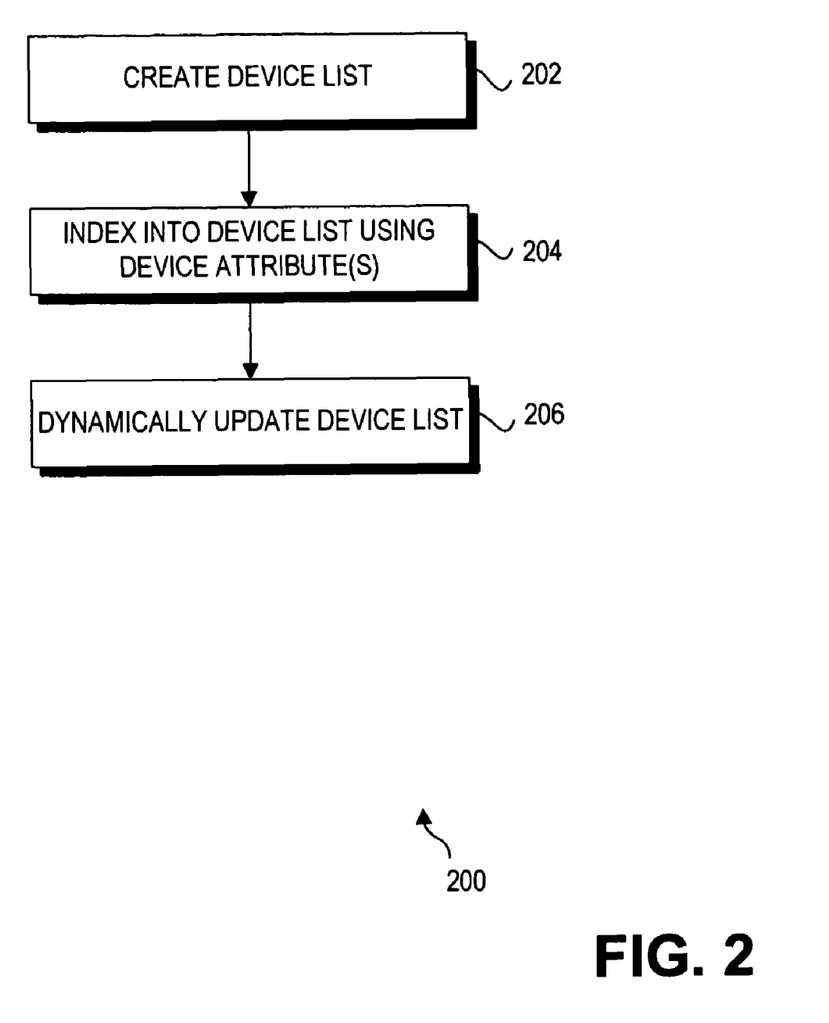
FIG. 2 is a flowchart illustrating the logic and operations for attribute-based indexing in accordance with one embodiment of the present invention.

FIG. 2 shows a flowchart 200 of the logic and operations of an embodiment of the invention. In one embodiment, the logic of flowchart 200 may be implemented as machine-readable instructions that may be executed by a machine, such as a computer system. An embodiment of a computer system is described below in conjunction with FIG. 9.

In a block 202 of flowchart 200, a device list is created. In one embodiment, creating the device list may include populating the device list with one or more device objects corresponding to respective physical devices. Each device object may include device attributes of the corresponding physical device. As discussed below, a device attribute may be used as an index into the device list to find a particular device.

Figure 3:
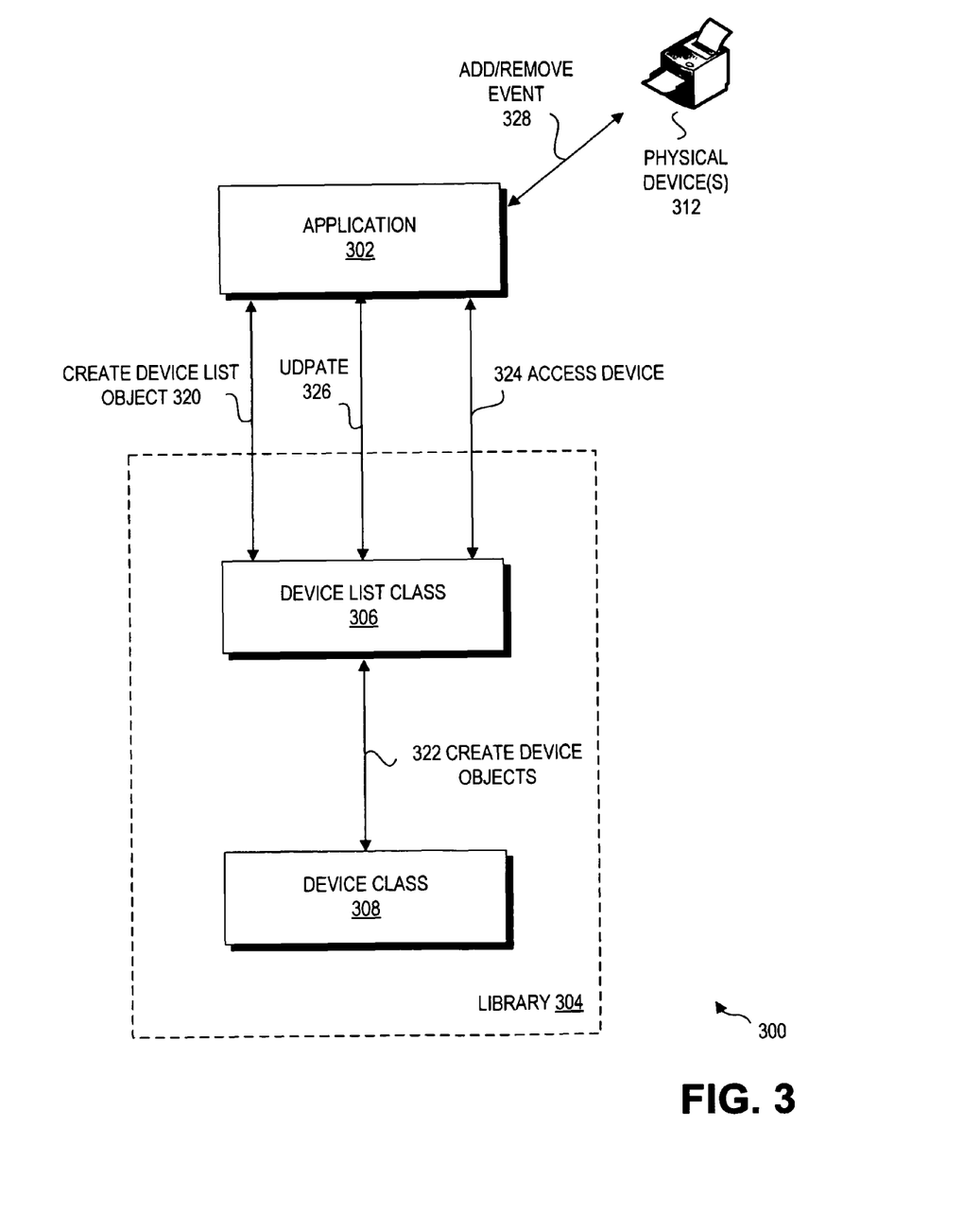
FIG. 3 is a diagram illustrating a system for attribute-based indexing in accordance with one embodiment of the present invention.

Referring to FIG. 3, an embodiment of creating a device list using object-oriented programming is shown. In a computer system 300, an application 302 calls a library 304 to initiate the creation of a device list. In one embodiment, library 304 is a dynamic library, such as a dynamically linked library; while in another embodiment, library 304 is a static library.

In one embodiment, library 304 is called during the launching of application 302; in another embodiment, library 304 is called when library 304 is first needed by application 302. In one embodiment, the library may be called by different applications, so if multiple applications are executing, then each application may call library 304 to construct each application's own instance of a device list.

Application 302 calls the Device List class constructor of library 304 to create a Device List object, as shown at 320. The Device List object instantiates it internal Items array by calling the Device class constructor, as shown at 322. The Device class constructor obtains the device attributes from one or more physical devices 312. The Device class constructor may be called multiple times to create multiple device objects corresponding to multiple physical devices. In general, a class constructor is invoked to create an object defined by a class. Similarly, a class destructor may be invoked to delete an object.

Figure 4:
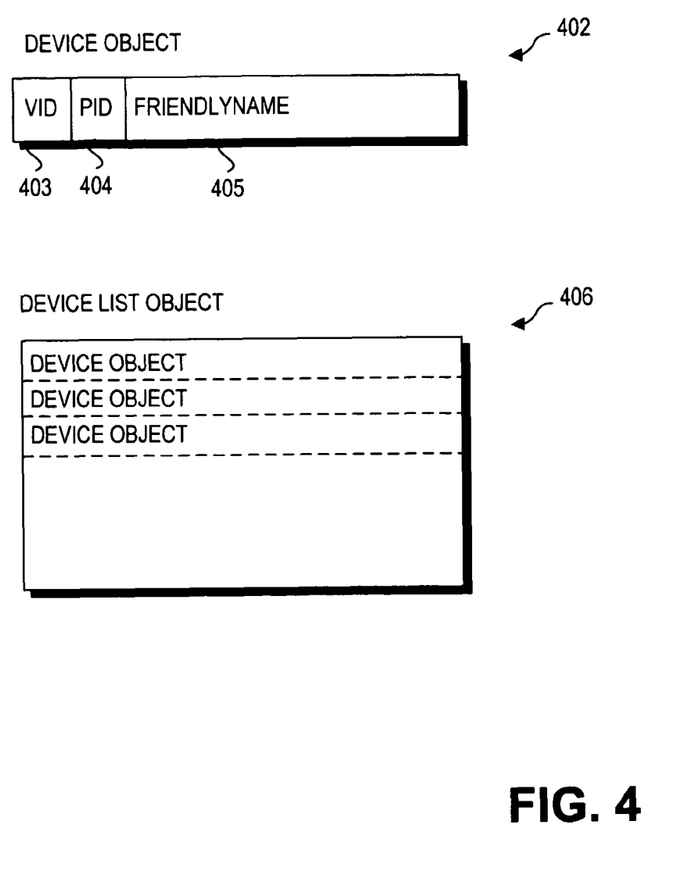
FIG. 4 is a diagram illustrating a device object and a device list object in accordance with one embodiment of the present invention.

FIG. 4 shows an embodiment of a user-defined device list object 406. Device list object 406 represents a list of device objects, three of which are shown, defined by the device class. Device object list 406 includes a member array (in one embodiment called "items") of device objects.

Creating the device list includes populating the device list with one or more device objects. In one embodiment, the device list class constructor populates the device list with instances of the device class (that is, device objects), one instance for each physical device detected. As used herein, populating the device list with device objects includes populating device list with device objects or pointers to the device objects.

A device class constructor queries the one or more physical devices coupled to computer system and creates one or more corresponding device objects. As used herein, the term "coupled" includes physical devices that are wired or wirelessly attached to computer system 300. Physical device(s) 312 may include physical devices internal or external to computer system 300. Embodiments of physical device 312 may include a keyboard, a mouse, a printer, a storage device, or the like. Embodiments of physical device 312 may also include electronic devices such as a digital camera, a camcorder, a media player, or the like. In one embodiment, physical device 312 includes a USB device.

In one embodiment of object-oriented programming, a user-defined device class is defined and used to create device objects. A device object is an instance of the device class. The device class has data members that may serve as indexers into a list of objects of the device class. The data members include device attributes of the physical devices. The data members may be of any data-type. Embodiments of a data-type include a string, an integer, a floating point value, a true/false value, or the like.

Referring to FIG. 4, an embodiment of a device object 402 is shown. Device object 402 includes three data members: VID 403, PID 404, and FriendlyName 405. VID 403 and PID 404 may each be an integer data type, and FriendlyName 405 may be a string data type. In embodiment, members 403-405 correspond to USB device attributes that are defined in the USB specification. USB devices report their attributes using standard device descriptors.

In one embodiment, the device list is populated with device objects that are supported by a particular type of device driver. Device driver types correspond to various types of physical devices. In one embodiment, a device driver type includes a Human Interface Device (HID) driver to support HID devices, such as keyboards, mice, or the like. In another embodiment, a device driver type includes a mass storage device driver to support mass storage devices. In yet another embodiment, a device driver type includes a vendor specific device driver to support vendor-specific devices.

In one embodiment, the device list class constructor may receive identifiers for the device driver types to be used in populating the device list. For example, the device list class constructor may only populate the device list with devices that use a HID device driver or only with devices that are tied to a vendor specific device driver. The ability to selectively populate the device list enables an application programmer to populate a device list with particular device driver types for the application. The device driver types may be passed to the device list class constructor from the application.

Returning to flowchart 200, the device list may be indexed into using one or more device attributes, as shown in a block 204. In one embodiment, application 302 accesses a physical device by using an index operator of the device list, as shown at 324. An index operator may include one or more indices. The index operator may return one or more device objects that match the provided one or more indices. Application 302 may then perform various operations with the physical device once it has been located and accessed.

In object-oriented programming, a class may define data members (described above) and also function members or "methods". Most object oriented languages allow creation of specially-named methods, the names of which correspond to otherwise standard mathematical operators of the language, such as +, −, *, /, [ ], etc. In embodiments herein, the device list class defines one or more index operators that are used for indexing into the device list. An index operator may be represented by two square brackets ("[ ]").

An index operator does the work of searching the internal Items array for a match to the provided indices for a device object that possesses the index value. One or more matching device objects are returned for the index operator. As used herein, returning one or more device objects includes returning one or more device objects or one or more pointers to a corresponding one or more device objects. In one embodiment, if no devices matching the index are found in the device list, a NULL value is returned.

If more than one device object matches the search query, the index operator may return the first matching device object, the last matching device object, or all matching device objects. Other embodiments of return values for multiple matching device objects will be appreciated by one skilled in the art having the benefit of this disclosure.

Referring to flowchart 200, as shown in a block 206, the device list may be updated dynamically. Referring to FIG. 3, the device list may be updated, shown at 326, when a physical device 312 is added or removed from computer system 300, as shown at 328. In one embodiment, constructors and/or destructors of the device class and device list class are notified when a physical device 312 is added/removed. In response, the constructors and/or destructors may go out and interrogate for attached physical devices to determine which device has been added or removed, and then update the device list accordingly.

Embodiments herein simplify the programmatic location of and access to physical devices, such as a USB device. Embodiments herein allow access to devices using a familiar array-indexing syntax. However, unlike arrays, which require an integer value as an index, embodiments herein define a class that may use one or more attributes of the array elements as the index.

Figure 5:
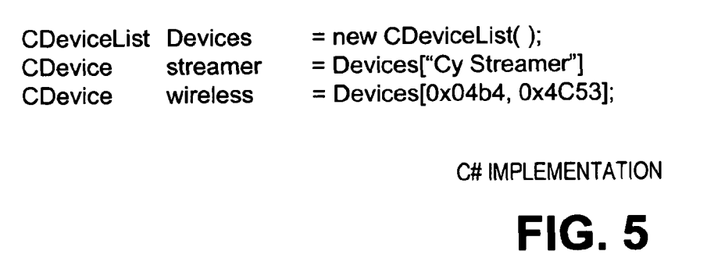
FIG. 5 shows code to locate and identify a device in accordance with one embodiment of the present invention.

FIG. 5 shows an embodiment of a C# code listing to locate and identify a device. The code listing of FIG. 5 accomplishes the same function as the conventional code listing of FIG. 1. However, embodiments of a method and software architecture described herein result in much shorter and more manageable code.

In FIG. 5, line 1 of the code invokes the constructor (called "CDevice List") to instantiate a device list object and populate the device list object with the devices it discovers are coupled to the computer system. Population of the device list's internal Items array enables the functionality of the index operators.

The last two lines of code of FIG. 5 include index operators having the same search parameters as the FOR loops 102 and 104 of FIG. 1. However, it will be appreciated that the code of FIG. 5 is shorter and convenient for application programmers. It is much easier for an application coder to write code such as in FIG. 5 and know that libraries, such as library 304, will take care of the device list initialization, population, and searching.

Figure 6:
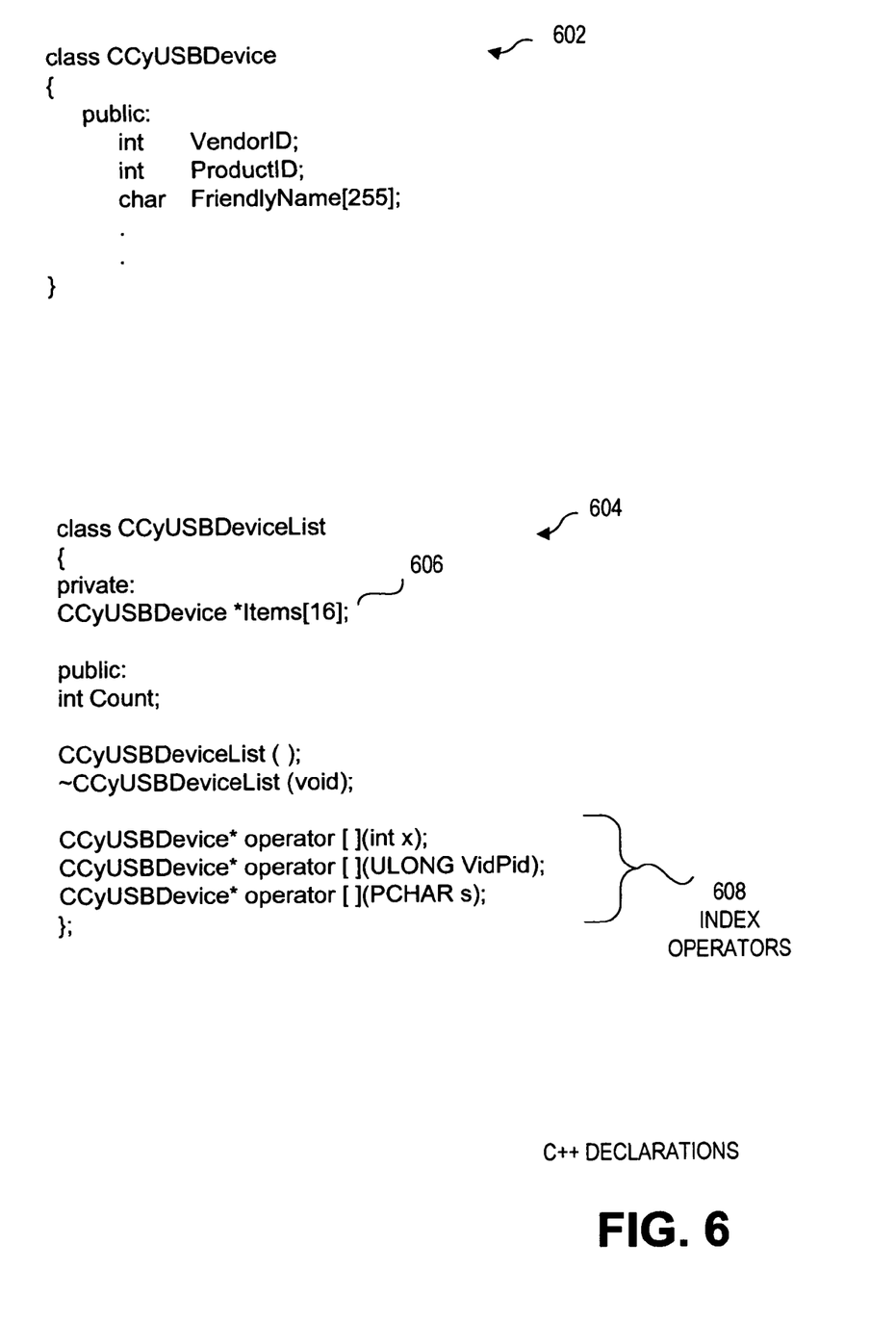
FIG. 6 shows declarations in accordance with one embodiment of the present invention.

FIG. 6 shows C++ declarations for the CCyUSBDevice class and the CCyUSBDeviceList class in accordance with an embodiment of the invention. The declaration of a CCyUSBDevice class is shown at 602. The CCyUSBDevice class includes members for vendor ID and product ID device attributes (integers), as well as a FriendlyName member (255 character string).

The declaration of a CCyUSBDeviceList class is shown at 604. Note that the CCyUSBDeviceList class contains a member array (called Items), shown at 606, of pointers to instances of the CCyUSBDevice class. The Items array has 16 pointers to correspond to 16 USB devices. At construction time, as many CCyUSBDevice objects will be created as correspond to the number of USB devices coupled to the computer system. Pointers to these CCyUSBDevice objects will be stored in the Items array.

Also note that the three index operators, shown at 608, all return pointers to instances of the CCyUSBDevice class. The first index operator returns the "x" device object in the CCyUSBDeviceList (for example the $5^{th}$ device object in the device list). In one embodiment, if the device list includes 4 device objects and the $5^{th}$ device object is requested, then a NULL is returned.

The second index operator returns the device object having the indexed VID and PID. It will be noted that the "VidPid" unsigned long (ULONG) member is due to formatting requirements of C++. The third index operator is for string indexing.

Figure 7:
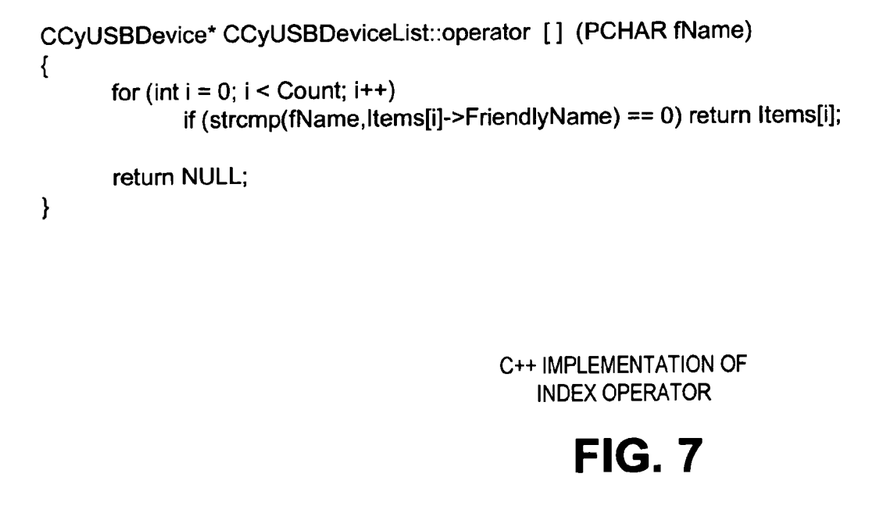
FIG. 7 shows code of an index operator in accordance with one embodiment of the present invention.

FIG. 7 shows an implementation of the third index operator declared in FIG. 6. The implementation searches the Items array to locate an element that matches the fName index that was passed to the index operator.

Figure 8:
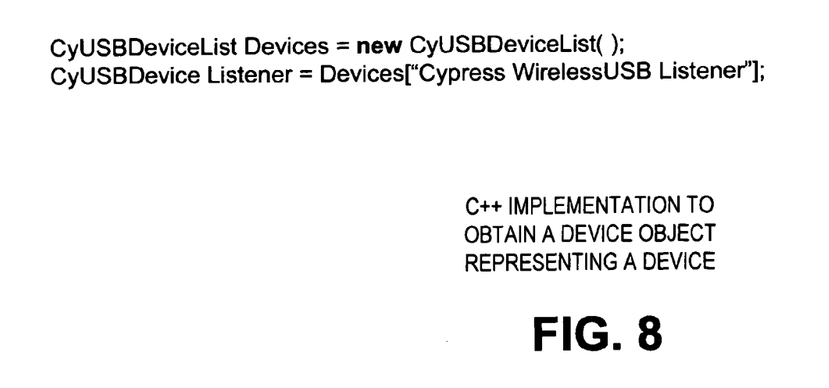
FIG. 8 shows code to obtain an object representing a device in accordance with one embodiment of the present invention.

In order to locate a particular USB device, the programmer creates an instance of the DeviceList class. Then, knowing the attribute of the device of interest, the programmer can reference that device using the attribute as an index into the device list. For example, if the programmer knows that the device of interest has a FriendlyName attribute of "Cypress WirelessUSB Listener", the code of FIG. 8 would obtain an object representing that device.

Embodiments of the present invention provide a method and a software architecture that includes a single code statement in an application to find a specified element of a list. Conventional implementations would require an iterative loop (e.g., a FOR loop) be added to the application code to walk through the list and locate the specified element. Furthermore, embodiments herein use a simple familiar syntax that passes well known attributes of the devices as index arguments.

It will be appreciated that in alternate embodiments, various computer languages may be used to implement embodiments of the invention. Exemplary languages may include object-oriented programming languages, such as C and its variations, such as C++ and C#, Java, or the like. It will also be appreciated that embodiments herein are not limited to USB devices and may be applied to lists of other categories of devices.

Figure 9:
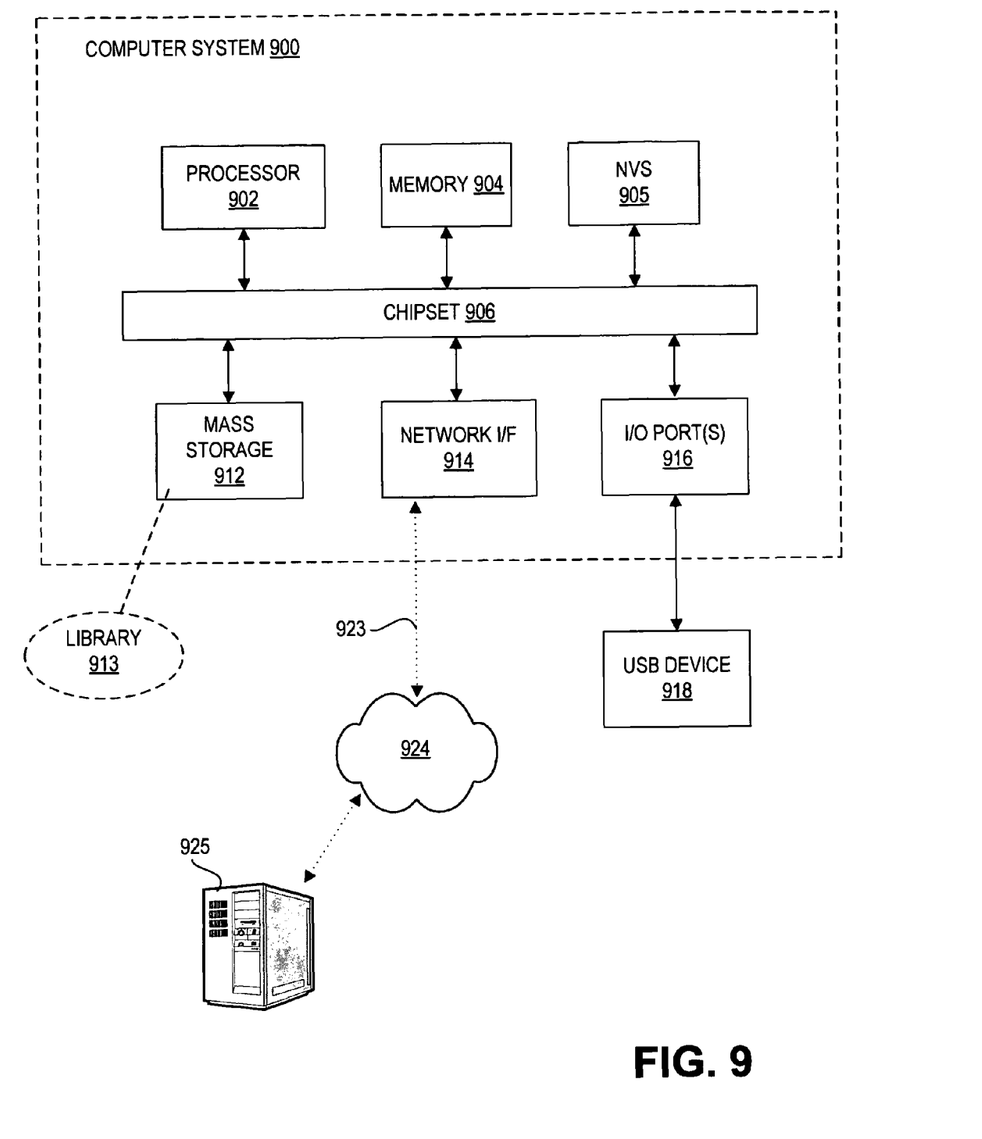
FIG. 9 is a diagram illustrating a computer system in accordance with one embodiment of the present invention.

FIG. 9 is an illustration of one embodiment a computer system 900 on which embodiments of the present invention may be implemented. Computer system 900 includes a processor 902 and a memory 904 coupled to a chipset 906. Mass storage 912, Non-Volatile Storage (NVS) 905, network interface (I/F) 914, and Input/Output (I/O) port(s) 916 may also be coupled to chipset 906. Embodiments of computer system 900 include, but are not limited to, a desktop computer, a notebook computer, a pocket computer, a personal digital assistant, a server, a network workstation, or the like. Embodiments of computer system 900 also include electronic devices, such a television set-top-box. In one embodiment, computer system 900 includes processor 902 coupled to memory 904, processor 902 to execute instructions stored in memory 904.

Memory 904 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like.

Chipset 906 may include a memory controller and an input/output controller. Chipset 906 may also include system clock support, power management support, audio support, graphics support, or the like. In one embodiment, chipset 906 is coupled to a board that includes sockets for processor 902 and memory 904.

Components of computer system 900 may be connected by various interconnects. Such interconnects may include a Peripheral Component Interconnect (PCI), a System Management bus (SMBUS), a Low Pin Count (LPC) bus, a Serial Peripheral Interface (SPI) bus, an Accelerated Graphics Port (AGP) interface, or the like.

One or more I/O ports 916 may include ports for a keyboard, a mouse, a display, a printer, a scanner, or the like. Embodiments of an I/O port 916 include a Universal Serial Bus port, a Firewire port, a Video Graphics Array (VGA) port, a Personal System/2 (PS/2) port, or the like.

A USB device 918 may be coupled to computer system 900 via an I/O port 916. USB device 918 may include an external device or an internal device.

Computer system 900 may have stored computer-readable instructions for locating devices coupled to computer system 900, in accordance with embodiments described herein. In one embodiment, these instructions are part of a library 913 stored in mass storage 912.

Computer system 900 may interface to external systems through network interface 914. Network interface 914 may include, but is not limited to, a modem, a Network Interface Card (NIC), or other interfaces for coupling a computer system to other computer systems. A carrier wave signal 923 may be received/transmitted by network interface 914. In the embodiment illustrated in FIG. 9, carrier wave signal 923 is used to interface computer system 900 with a network 924, such as a Local Area Network (LAN), a Wide Area Network (WAN), the Internet, or any combination thereof. In one embodiment, network 924 is further coupled to a computer system 925 such that computer system 900 and computer system 925 may communicate over network 924.

Computer system 900 also includes non-volatile storage 905 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), Non-Volatile Random Access Memory (NVRAM), or the like. Mass storage 912 includes, but is not limited to, a magnetic disk drive, a magnetic tape drive, an optical disk drive, or the like. It is appreciated that instructions executable by processor 902 may reside in mass storage 912, memory 904, non-volatile storage 905, or may be transmitted or received via network interface 914.

In one embodiment, computer system 900 may execute Operating System (OS) software. Embodiments of an operating system include Microsoft Windows®, the Apple Macintosh operating system, the Linux operating system, the Unix operating system, or the like.

For the purposes of the specification, a machine-readable medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-readable medium includes, but is not limited to, recordable/non-recordable media (e.g., Read-Only Memory (ROM), Random Access Memory (RAM), magnetic disk storage media, optical storage media, a flash memory device, etc.).

Various operations of embodiments of the present invention are described herein. These operations may be implemented by a machine using a processor, an Application Specific Integrated Circuit (ASIC), a Field Programmable Gate Array (FPGA), or the like. In one embodiment, one or more of the operations described may constitute instructions stored on a machine-readable medium, that when executed by a machine will cause the machine to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A method, comprising:
   creating a device list including a plurality of device objects, wherein each device object represents a physical device coupled to a computer system, wherein each device object includes one or more device attributes of the physical device; and
   indexing into the device list using a device attribute wherein indexing into the device list includes executing an index operator comprising a single computer code statement using array-indexing syntax and including one or more of multiple indices and non-integer indices as index arguments making up the computer code statement, wherein at least one device attribute is used as an index argument of the index operator.

2. The method of claim 1, wherein
   creating the device objects includes obtaining the one or more device attributes of each physical device.

3. The method of claim 1, wherein
   creating the device list includes populating the device list with at least three device objects.

4. The method of claim 3 including populating the device list with the device objects supported by a designated device driver type corresponding to the physical device.

5. The method of claim 1, further comprising calling a library by an application executing on the computer system, wherein the library includes instructions for creating the device list.

6. The method of claim 1, further comprising dynamically updating the device list in response to a physical device being added or removed from the computer system.

7. An article of manufacture, comprising:
   a machine-readable medium including a plurality of instructions which when executed perform operations comprising:
   creating a device list including at least three device objects, wherein each device object represents a Universal Serial Bus (USB) device coupled to a computer system, wherein each device object includes one or more device attributes of the USB device; and
   indexing into the device list using a device attribute wherein indexing into the device list includes executing an index operator comprising a single computer code statement using array-indexing syntax and including one or more of multiple indices and non-integer indices as index arguments making up the computer code statement, wherein at least one device attribute is used as an index argument of the index operator.

8. The article of manufacture of claim 7 wherein execution of the plurality of instructions further perform operations comprising:
   creating the device objects including obtaining the one or more device attributes of each USB device.

9. The article of manufacture of claim 7 wherein populating the device list includes populating the device list with the device objects.

10. The article of manufacture of claim 9 wherein populating the device list includes populating the device list with the device objects representing an individual USB device supported by a designated device driver type.

11. The article of manufacture of claim 7 wherein execution of the plurality of instructions further perform operations comprising:
    dynamically updating the device list in response to a USB device being added or removed from the computer system.

12. A computer system, comprising:
    a processor;
    Universal Serial Bus (USB) devices coupled to the processor; and
    a storage unit coupled to the processor, wherein the storage unit including a plurality of instructions which when executed by the processor perform operations comprising:
    creating a plurality of device objects, wherein each device object corresponds to one of the USB devices, wherein each device object includes one or more device attributes of the corresponding USB device;
    creating a device list including the plurality of device objects; and
    indexing into the device list using a device attribute wherein indexing into the device list includes executing an index operator comprising a single computer code statement using array-indexing syntax and including one or more of multiple indices and non-integer indices as index arguments making up the computer code statement, wherein at least one device attribute is used as an index argument of the index operator.

13. The computer system of claim 12 wherein creating the device list includes populating the device list with the device objects corresponding to each USB device supported by a designated device driver type.

14. The computer system of claim 12 wherein execution of the plurality of instructions further performs operations comprising:

dynamically updating the device list in response to a USB device being added or removed from the computer system.

\* \* \* \* \*